A. J. THROWER.
COTTON PICKER.
APPLICATION FILED MAR. 29, 1919.

1,312,010.

Patented Aug. 5, 1919.
2 SHEETS—SHEET 1.

Witness

Inventor,
A. J. Thrower
By C. A. Snow & Co.
Attorneys.

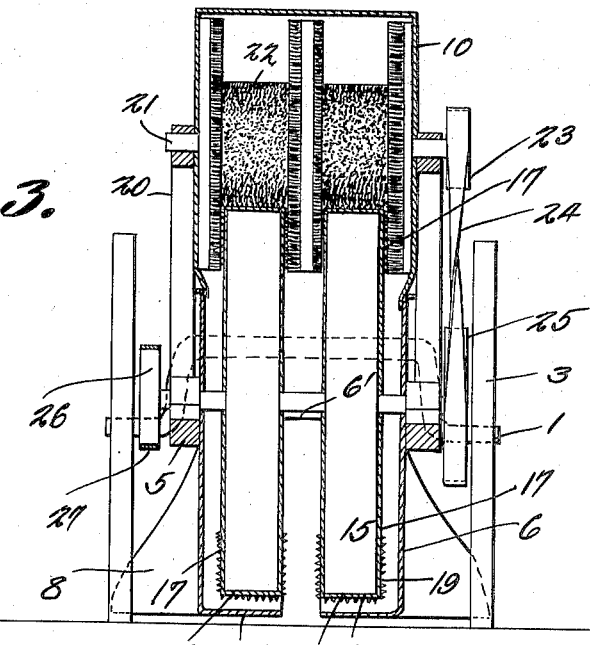
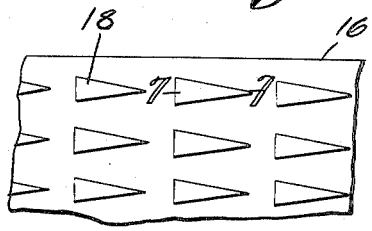
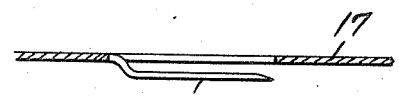
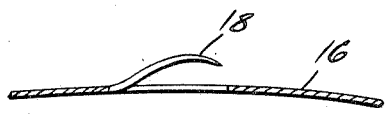

UNITED STATES PATENT OFFICE.

ALBERT J. THROWER, OF DEXTER, MISSOURI.

COTTON-PICKER.

1,312,010.     Specification of Letters Patent.     Patented Aug. 5, 1919.

Application filed March 29, 1919. Serial No. 286,011.

*To all whom it may concern:*

Be it known that I, ALBERT J. THROWER, a citizen of the United States, residing at Dexter, in the county of Stoddard and State of Missouri, have invented a new and useful Cotton-Picker, of which the following is a specification.

This invention relates to machines for picking cotton, one of its objects being to provide a machine which can be pulled along the rows of plants and is particularly designed for removing from the dried plants all of the cotton remaining thereon.

A further object is to provide simple and efficient means for removing the cotton from the plant, the said cotton being subsequently doffed and directed into a container provided therefor.

Another object is to provide a machine of this character which is simple in construction, compact and efficient and can be manipulated readily.

With the foregoing and other objects in view which will appear as the description proceeds, the invention resides in the combination and arrangement of parts and in the details of construction hereinafter described and claimed, it being understood that changes in the precise embodiment of the invention herein described can be made within the scope of what is claimed without departing from the spirit of the invention.

In the accompanying drawing the preferred form of the invention has been shown.

In said drawing:—

Fig. 3 is a vertical transverse section on line 3—3, Fig. 1, the doffing wheels being shown in elevation and the toothed portions of the picking wheels being shown in section while said wheels are in elevation;

Fig. 4 is a side elevation of a portion of one of the picking wheels, on an enlarged scale;

Fig. 5 is an enlarged section on line 5—5, Fig. 4;

Fig. 6 is a plan view of a portion of one of the picking wheels; and

Fig. 7 is an enlarged section on line 7—7, Fig. 6.

Figure 1:
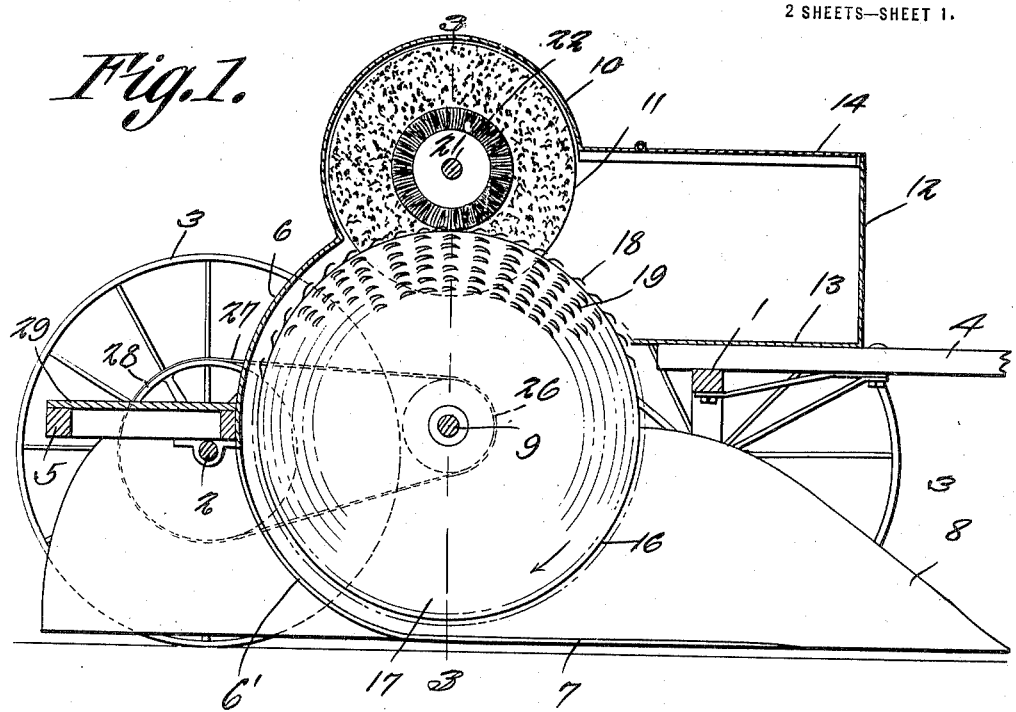
Figure 1 is a vertical, longitudinal section through the machine.
Figure 2:
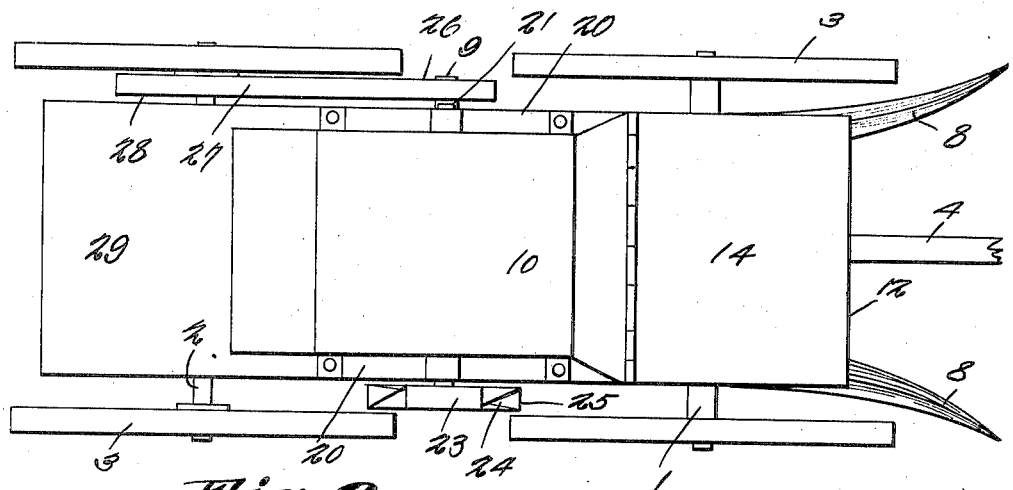
Fig. 2 is a plan view thereof.

Referring to the drawing by characters of reference, 1 designates an arched front axle and 2 designates a rear axle, these axles being supported by front and rear wheels 3, as indicated. A draft tongue 4 is connected to the front axle so that the machine can be drawn readily along a row of plants.

The axles support a frame 5 and secured within this frame is a housing 6 having a forwardly-extending bottom 7, the sides of the housing being extended forwardly beyond this bottom and shaped to constitute lifting members, as indicated at 8.

The arcuate rear wall of the housing 6 merges into the bottom 7 of said housing and is concentric with a transverse shaft 9. This shaft extends through the sides of the housing 6 and is journaled on the sides of the frame 5. The bottom of the housing is open so that plants being acted on can extend upwardly therethrough until they come into contact with the picking means hereinafter described, and an opening may also be extended upwardly in the arcuate back of the housing so as to constitute a continuation of the space in the bottom 7, this opening in the back being indicated at 6'.

Arranged on the top of the housing 6 is an arcuate extension 10 provided with a front outlet 11 opening into a housing 12 which is mounted on the frame 5 and extends over a platform 13. This housing may be provided with a liftable cover 14 as shown.

Secured to the shaft 9 are spaced wheels 15 which are closed at the sides and which are also spaced from the sides of the housing 6. The rim of each wheel is faced with a metal band 16 having side flanges 17 bearing against the sides of the wheel. The rim portion 16 of the facing has annular series of teeth 18 struck outwardly therefrom and pointed in the direction of rotation, these teeth being preferably curved with their points extended slightly inwardly as shown particularly in Fig. 7. Additional series of teeth are struck outwardly from the flanges of the facing, as shown at 19, each tooth being substantially crescent-shaped and pressed laterally from but substantially parallel with its flange, the points being extended in the same general direction as the direction of rotation but curved slightly inwardly toward the axis of the wheel.

A standard 20 is mounted on the frame at each side of the housing 6 and supports a transverse shaft 21 extending through the housing extension 10. Secured to the transverse shaft are spool-shaped brushes 22 the flange portions of which extend downwardly across the flanges of the facings 16 while the intermediate portion of each brush extends across and in contact with the rim portion of each wheel. The shaft 21 has a pulley 23 thereon which receives motion, through a belt 24, from another pulley 25 secured to one end of the shaft 9, the said belt 24 being twisted so that the shafts 9 and 21 will rotate in opposite directions. Another pulley 26 is secured to the other end of the shaft 9 and receives motion, through a belt 27, from a pulley 28 secured to the rear axle 2, or, if preferred, to one of the rear wheels 3.

It will be apparent that when the machine is drawn forward the belt 27 will rotate shaft 9 and wheel 15 in the direction indicated by the arrow in Fig. 1. The plants will be received between the lifting members 8 which will elevate the branches and guide them into the housing 6. The plants will pass through the space between the wheel 15, some of the branches passing under the wheels and others passing between the wheels and the sides of the housing. The plants will thus be subjected to a crushing action and during the rotation of the wheels the teeth 18 and 19 will engage the cotton fibers and pull them from the bolls. The brushes 22 rotate in a direction opposite to the wheels 15 and at a higher speed with the result that, when the cotton fiber is elevated by the teeth, the brushes will doff the fiber from the teeth and throw it into the housing 12. A suitable receptacle can be provided in this housing for the reception of the cotton and after the receptacle has been filled it can be placed on a platform 29 at the back of the machine and another receptacle placed in the housing.

What is claimed is:—

1. A machine for picking cotton, including a housing, means for directing plants into the housing, spaced wheels mounted for rotation in the housing and adapted to receive plants therebetween, picking teeth upon the periphery and the sides of each wheel and projecting in the direction of rotation of the wheel, and a revoluble doffing brush straddling each wheel and movable at a higher speed than the picking wheel.

2. A machine for picking cotton, including a housing, means for guiding plants into the housing, wheels mounted for rotation in the housing and spaced therefrom and from each other, a facing upon the rim portion of each wheel and having flanges lapping the sides of the wheel, said facing having its rim portion and flange portion provided with outstanding teeth extending in the direction of rotation, doffing brushes straddling the upper portions of the wheels and engaging the toothed facings and flanges, and means for rotating the wheels and brushes in opposite directions respectively, said brushes being revoluble at a higher speed than the wheels.

3. A machine for picking cotton, including a housing, wheels therein and spaced therefrom, said wheels being spaced from each other to provide a plant-receiving passage therebetween, each wheel being provided with flat sides, a facing on each wheel having inwardly extending side flanges lapping the sides of the wheel, outstruck teeth upon the peripheral portion of the casing and extending in the direction of rotation, the points of the teeth being slightly inturned, arcuate teeth outstruck from the flanges of the facing and parallel therewith, said teeth being extended in the same general direction as the direction of rotation, and means for doffing material from the teeth.

4. A machine for picking cotton including a housing, wheels within and spaced from the housing and spaced from each other, means for rotating said wheels, a facing upon the peripheral portion of each wheel and having side flanges lapping the sides of the wheel, said sides being flat and imperforate, outstruck teeth upon the peripheral portion of each facing and extended in the direction of rotation, outstruck arcuate teeth upon the flanges of each facing and parallel therewith, said teeth being extended in the direction of rotation, spool-like brushes straddling the upper portions of the respective wheels and engaging the toothed surface of the facing, means for rotating the brushes oppositely to the wheels and at a higher speed, and a housing for receiving material doffed by the brushes from the toothed surfaces.

In testimony that I claim the foregoing as my own I have hereto affixed my signature.

ALBERT J. THROWER.